United States Patent [19]

Monier

[11] Patent Number: 6,032,196

[45] Date of Patent: Feb. 29, 2000

[54] SYSTEM FOR ADDING A NEW ENTRY TO A WEB PAGE TABLE UPON RECEIVING A WEB PAGE INCLUDING A LINK TO ANOTHER WEB PAGE NOT HAVING A CORRESPONDING ENTRY IN THE WEB PAGE TABLE

[75] Inventor: Louis M. Monier, Redwood City, Calif.

[73] Assignee: Digital Equipment Corporation, Maynard, Mass.

[21] Appl. No.: 09/143,110

[22] Filed: Aug. 28, 1998

Related U.S. Application Data

[63] Continuation of application No. 08/571,748, Dec. 13, 1995.

[51] Int. Cl.[7] .............................. G06F 9/44; G06F 13/00
[52] U.S. Cl. ............................. 709/245; 710/3; 709/220
[58] Field of Search ........................... 710/1, 3; 709/220, 709/245

[56] References Cited

U.S. PATENT DOCUMENTS

| | | | |
|---|---|---|---|
| 4,847,830 | 7/1989 | Momirov | 370/94 |
| 5,010,344 | 4/1991 | Nagy | 341/65 |
| 5,291,601 | 3/1994 | Sands | 395/700 |
| 5,357,617 | 10/1994 | Davis et al. | 395/375 |
| 5,390,318 | 2/1995 | Ramakrishnan et al. | 395/425 |
| 5,467,264 | 11/1995 | Rauch et al. | 364/141 |
| 5,493,676 | 2/1996 | Amundson | 395/183.18 |
| 5,675,779 | 10/1997 | Doktor | 395/604 |

OTHER PUBLICATIONS

Article–Cataloguing Internet Resources: The Library Approach by Vianne T. Sha—Jan. 1996—6 pgs. XP 000647883.

Article: The Searchers by David Simpson and Gabriel Jacobs—Oct. 1995—9 pgs. XP 000646762.

*Primary Examiner*—Thomas C. Lee
*Assistant Examiner*—Rehana Perveen
*Attorney, Agent, or Firm*—Jenkens & Gilchrist, P.C.

[57] ABSTRACT

A table of web pages is maintained by requesting a web page, receiving the requested web page, and identifying an address, such as a URL, of the received web page. A locator, such as a fingerprint, which represents the address of the received web page is entered into the table of web pages to maintain the table. The locator has a size smaller than the address.

17 Claims, 5 Drawing Sheets

SYSTEM FOR ADDING A NEW ENTRY TO A WEB PAGE TABLE UPON RECEIVING A WEB PAGE INCLUDING A LINK TO ANOTHER WEB PAGE NOT HAVING A CORRESPONDING ENTRY IN THE WEB PAGE TABLE

CROSS REFERENCE TO RELATED APPLICATIONS

This application is a continuation of Application Ser. No. 08/571,748 filed on Dec. 12, 1995 (now pending allowances).

The present invention relates generally to systems and method for accessing documents, called pages, on the World Wide Web (WWW), and particularly to a system and method for quickly locating and analyzing pages on the World Wide Web.

BACKGROUND OF THE INVENTION

Web documents, herein called Web pages, are stored on numerous server computers (hereinafter "servers") that are connected to the Intenet. Each page on the Web has a distinct URL (universal resource locator). Many of the documents stored on Web servers are written in a standard document description language called HTML (hypertext markup language). Using HTML, a designer of Web documents can associate hypertext links or annotations with specific words or phrases in a document and specify visual aspects and the content of a Web page. The hypertext links identify the URLs of other Web documents or other parts of the same document providing information related to the words or phrases.

A user accesses documents stored on the WWW using a Web browser (a computer program designed to display HTML documents and communicate with Web servers) running on a Web client connected to the Internet. Typically, this is done by the user selecting a hypertext link (typically displayed by the Web browser as a highlighted word or phrase) within a document being viewed with the Web browser. The Web browser then issues a HTTP (hypertext transfer protocol) request for the requested document to the Web server identified by the requested document's URL. In response, the designated Web server returns the requested document to the Web browser, also using the HTTP.

As of the end of the 1995, the number of pages on the portion of the Internet known as the World Wide Web (hereinafter the "Web") had grown several fold during the prior one year-period to at least 30 million pages. The present invention is directed at a system for keeping track of pages on the Web as the Web continues to grow.

The systems for locating pages on the Web are known variously as "Web crawlers," "Web spiders" and "Web robots." The present invention has been coined a "Web scooter" because it is so much faster than all known Web crawlers. The terms "Web crawler," "Web spider," "Web scooter," "Web crawler computer system," and "Web scooter computer system" are used interchangeably in this document.

Prior art Web crawlers work generally as follows. Starting with a root set of known Web pages, a disk file is created with a distinct entry for every known Web page. As additional Web pages are fetched and their links to other pages are analyzed, additional entries are made in the disk file to reference Web pages not previously known to the Web crawler. Each entry indicates whether or not the corresponding Web page has been processed as well as other status information. A Web crawler processes a Web page by (A) identifying all links to other Web pages in the page being processed and storing related information so that all of the identified Web pages that have not yet been processed are added to a list of Web pages to be processed or other equivalent data structure, and (B) passing the Web page to an indexer or other document processing system.

The information about the Web pages already processed is generally stored in a disk file, because the amount of information in the disk file is too large to be stored in random access memory (RAM). For example, if an average of 100 bytes of information are stored for each Web page entry, a data file representing 30 million Web pages would occupy about 3 Gigabytes, which is too large for practical storage in RAM.

Next we consider the disk I/O incurred when processing one Web page. For purposes of this discussion we will assume that a typical Web page contains 20 references to other Web pages, and that a disk storage device can handle no more than 50 seeks per second. The Web crawler must evaluate each of the 20 page references in the page being processed to determine if it already knows about those pages. To do this it must attempt to retrieve 20 records from the Web information disk file. If the record for a specified page reference already exists, then that reference is discarded because no further processing is needed. However, if a record for a specified page is not found, an attempt must be made to locate a record for each possible alias of the page's address, thereby increasing the average of number of disk record seeks needed to analyze an average Web page to about 50 disk seeks per page.

If a disk file record for a specified page reference does not already exist a new record for the referenced page is created and added to the disk file, and that page reference is either added to a queue of pages to be processed, or the disk file entry is itself used to indicate that the page has not yet been fetched and processed.

Thus, processing a single Web page requires approximately 20 disk seeks (for reading existing records and for writing new records). As a result, given a limitation of 50 disk seeks per second, only about one Web pages can be processed per second.

In addition, there is a matter of network access latency. On average, it takes about 3 seconds on average to retrieve a Web page, although the amount of time is highly variable depending on the location of the Web server and the particular hardware and software being used on both the Web server and on the Web crawler computer. Network latency thus also tends to limit the number Web pages that can be processed by prior art Web crawlers to about 0.33 Web pages per second. Due to disk seek limitations, network latency, and other delay factors, a typical prior art Web crawler cannot process more than about 30,000 Web pages per day.

Due to the rate at which Web pages are being added to the Web, and the rate at which Web pages are being deleted and revised, processing 30,000 Web pages per day is inadequate for maintaining a truly current directory or index of all the Web pages on the Web. Ideally, a Web crawler should be able to visit (i.e., fetch and analyze) at least 2.5 million Web pages per day.

It is therefore an object of the present invention to provide an improved Web crawler that processes millions of Web pages per day. It is a related goal of the present invention to provide an improved Web crawler that overcomes the aforementioned disk seek limitations and network latency limitations so as to enable the Web crawler's speed of operation to be limited primarily by the processing speed of the Web crawler's CPU. It is yet another related goal of the present invention to provide a Web crawler system than can fetch and analyze, on average, at least 30 Web pages per second, and more preferably at least 100 Web pages per second.

SUMMARY OF THE INVENTION

In summary, the present invention is a system and method for quickly locating and making a directory of Web pages on the World Wide Web. The Web crawler system includes a hash table stored in random access memory (RAM) and a sequential file (herein called the "sequential disk file" or the "Web information disk file") stored in secondary memory, typically disk storage. For every Web page known to the system, the Web crawler system stores an entry in the sequential disk file as well as a smaller entry in the hash table. The hash table entry includes a fingerprint value, a fetched flag that is set true only if the corresponding Web page has been successfully fetched, and a file location indicator that indicates where the corresponding entry is stored in the sequential disk file. Each sequential disk file entry includes the URL of a corresponding Web page, plus fetch status information concerning that Web page.

All accesses to the Web information disk file are made sequentially via an input buffer such that a large number of entries from the sequential disk file are moved into the input buffer as single I/O operation. The sequential disk file is then accessed from the input buffer. Similarly, all new entries to be added to the sequential file are stored in an append buffer, and the contents of the append buffer are added to the end of the sequential whenever the append buffer is filled. In this way random access to the Web information disk file is eliminated, and latency caused by disk access limitations is minimized.

The procedure for locating and processing Web pages includes sequentially reviewing all entries in the sequential file and selecting a next entry that meets with established selection criteria. When selecting the next file entry to process, the hash table is checked for all known aliases of the current entry candidate to determine if the Web page has already been fetched under an alias. If the Web page has been fetched under an alias, the error type field of the sequential file entry is marked as a "non-selected alias" and the candidate entry is not selected.

Once a next Web page reference entry has been selected, the Web crawler system attempts to fetch the corresponding Web page. If the fetch is unsuccessful, the fetch status information in the sequential file entry for that Web page is marked as a fetch failure in accordance with the error return code returned to the Web crawler. If the fetch is successful, the fetch flag in the hash table entry for the Web page is set, as is a similar fetch flag in the sequential disk file entry (in the input buffer) for the Web page. In addition, each URL link in the fetched Web page is analyzed. If an entry for the URL referenced by the link or for any defined alias of the URL is already in the hash table, no further processing of the URL link is required. If no such entry is found in the hash table, the URL represents a "new" Web page not previously included in the Web crawler's database of Web pages and therefore an entry for the new Web page is added to the sequential disk file (i.e., it is added to the portion of the disk file in the append buffer). The new disk file entry includes the URL referenced by the link being processed, and is marked "not fetched". In addition, a corresponding new entry is added to the hash table, and the fetch flag of that entry is cleared to indicate that the corresponding Web page has not yet been fetched. In addition to processing all the URL links in the fetched page, the Web crawler sends the fetched page to an indexer for further processing.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
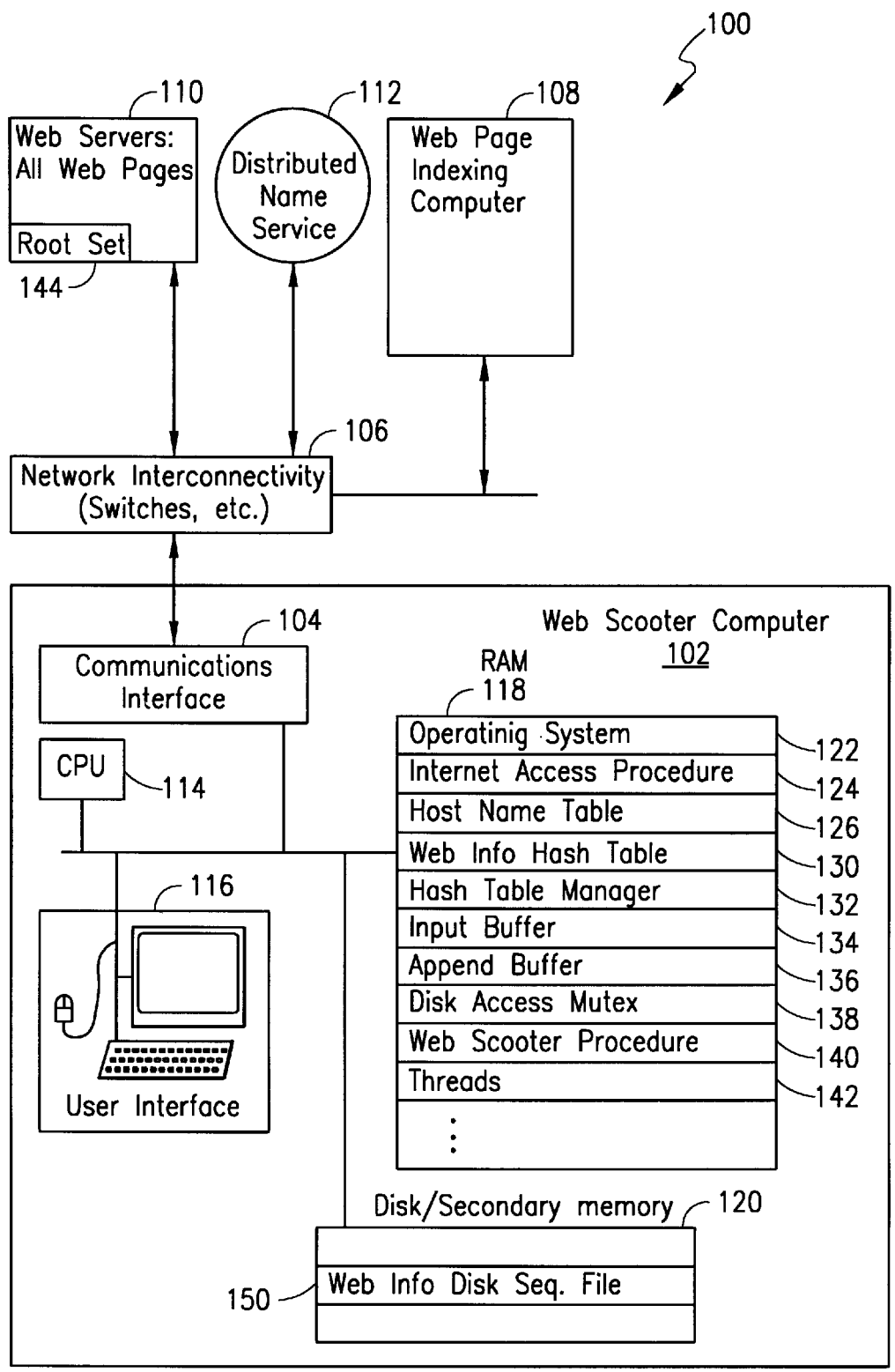
FIG. 1 is a block diagram of a preferred embodiment of a Web crawler system in accordance with the present invention.

Referring to FIG. 1, there is shown a distributed computer system 100 having a Web scooter computer system 102. The Web scooter is connected by a communications interface 104 and a set of Intermet and other network connections 106 to the Internet and a Web page indexing computer 108. In some embodiments the Web page indexing computer 108 is coupled directly to the Web scooter 102 through a private communication channel, without the use of a local or wide area network connection. The portions of the Internet to which the Web scooter 102 is connected are (A) Web servers 110 that store Web pages, and (B) servers that cooperate in a service known as the Distributed Name Service (DNS) collectively referenced here by reference numeral 112. For the purposes of this document it can be assumed that the DNS 112 provides any requester with the set of all defined aliases for any Internet host name, and that Internet host names and their aliases form a prefix portion of every URL.

In the preferred embodiment, the Web scooter 102 is an Alpha workstation computer made by Digital Equipment Corporation; however virtually any type of computer can be used as the Web scooter computer. In the preferred embodiment, the Web scooter 102 includes a CPU 114, the previously mentioned communications interface 104, a user interface 116, random access memory (RAM) 118 and disk memory (disk) 120. In the preferred embodiment the communications interface 104 is a very high capacity communications interface that can handle 1000 or more overlapping communication requests with an average fetch throughput of at least 30 Web pages per second.

In the preferred embodiment, the Web scooter's RAM has a Gigabyte of random access memory and stores:

a multitasking operating system 122;

an Intenet communications manager program 124 for fetching Web pages as well as for fetching alias information from the DNS 112;

a host name table 126, which stores information representing defined aliases for host names;

a Web information hash table 130;

a hash table manager procedure 132;

an input buffer 134 and an append buffer 136;

a mutex 138 for controlling access to the hash table 130, input buffer 134 and append buffer 136;

a Web scooter procedure 140; and thread data structures 142 for defining T1 threads of execution, where the value of T1 is an integer selectable by the operator of the Web scooter computer system 102 (e.g., T1 is set at a value of 1000 in the preferred embodiment).

Disk storage 120 stores a Web information disk file 150 that is sequentially accessed through the input buffer 134 and append buffer 136, as described in more detail below.

The host name table 126 stores information representing, among other things, all the aliases of each host name that are known to the DNS 112. The aliases are effectively a set of URL prefixes which are substituted by the Web scooter procedure 140 for the host name portion of a specified Web page's URL to form a set of alias URLs for the specified Web page.

The use and operation of the above mentioned data structures and procedures will next be described with reference to FIGS. 1 through 4 and with reference to Tables 1 and 2. Tables 1 and 2 together contain a pseudocode representation of the Web scooter procedure. While the pseudocode employed here has been invented solely for the purposes of this description, it utilizes universal computer language conventions and is designed to be easily understandable by any computer programmer skilled in the art.

Web Information Hash Table

Figure 2:
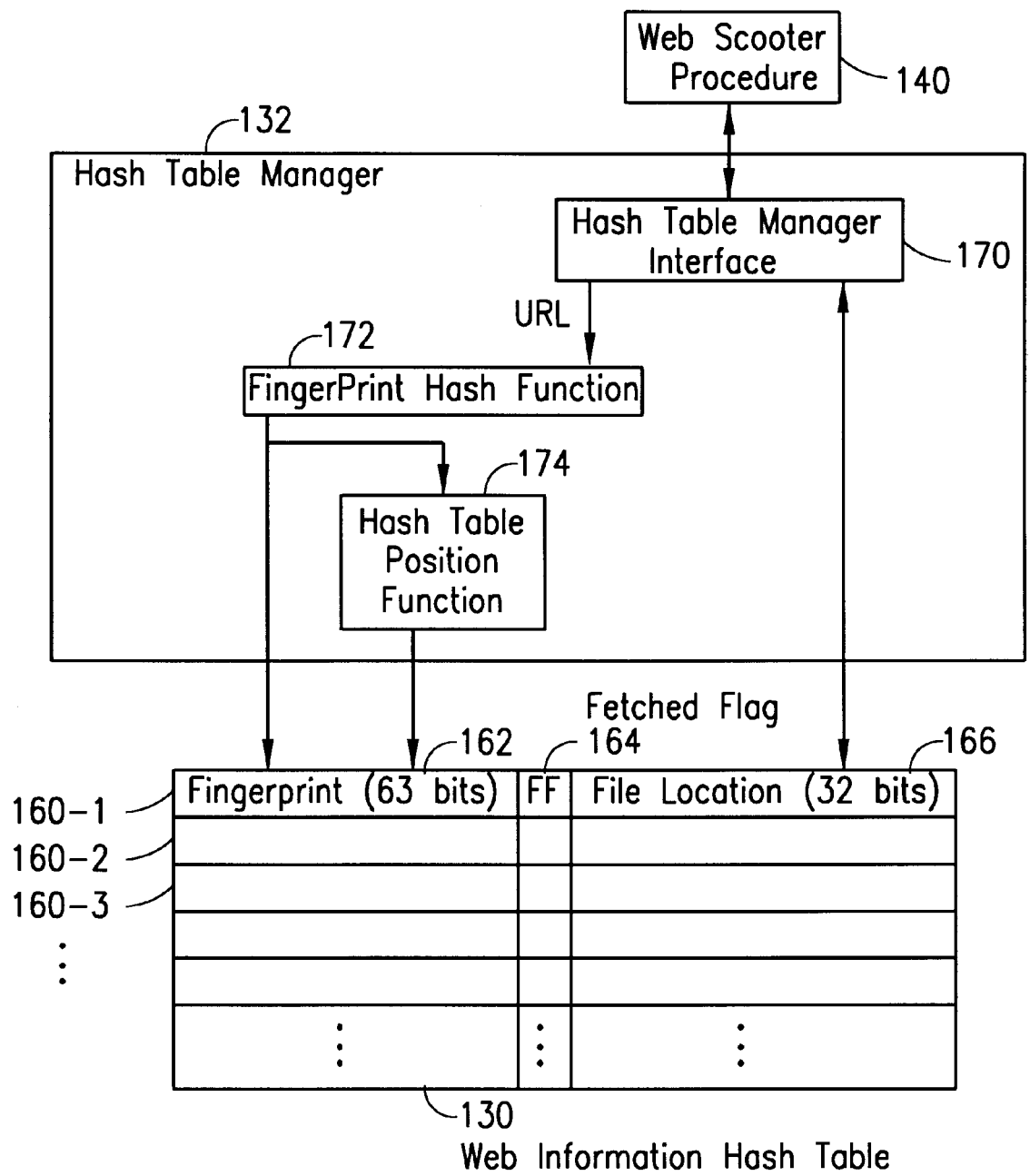
FIG. 2 is a block diagram of the hash table mechanism used in a preferred embodiment of the present invention.

Referring to FIG. 2, the Web information hash table 130 includes a distinct entry 160 for each Web page that has been fetched and analyzed by the Web scooter system as well as each. Web page referenced by a URL link in a Web page that has been fetched and analyzed. Each such entry includes:

a fingerprint value 162 that is unique to the corresponding Web page;

a one bit "fetched flag" 164 that indicates whether or not the corresponding Web page has been fetched and analyzed by the Web scooter; and a file location value 166 that indicates the location of a corresponding entry in the Web information disk file 150.

In the preferred embodiment, each fingerprint value is 63-bits long, and the file location values are each 32-bits long. As a result each hash table entry 160 occupies exactly 12 bytes in the preferred embodiment. While the exact size of the hash table entries is not important, it is important that each hash table entry 160 is significantly smaller (e.g., at least 75% smaller on average) than the corresponding disk file entry.

The hash table manager 132 receives, via its "interface" 170, two types of procedure calls from the Web scooter procedure 140:

a first request asks the hash table manager 132 whether or not an entry exists for a specified URL, and if so, whether or not the fetched flag of that record indicates that the corresponding Web page has previously been fetched and analyzed; and a second request asks the hash table manager to store a new entry in the hash table 130 for a specified URL and a specified disk file location.

The hash table manager 132 Utilizes a fingerprint hash function 172 to compute a 63-bit fingerprint for every URL presented to it. The fingerprint function 172 is designed to ensure that every unique URL is mapped into a similarly unique fingerprint value. The fingerprint function generates a compressed encoding of any specified Web page's URL. The design of appropriate fingerprint functions is understood by persons of ordinary skill in the art. It is note that while there are about $2^{25}$ to $2^{26}$ Web pages, the fingerprints can have $2^{63}$ distinct values.

When the Web scooter procedure 140 asks the hash table manager 132 whether or not the hash table already has an entry for a specified URL, the hash table manager (A) generates a fingerprint of the specified URL using the aforementioned fingerprint hash function 172, (B) passes that value to a hash table position function 174 that determines where in the hash table 130 an entry having that fingerprint value would be stored, (C) determines if such an entry is in fact stored in the hash table, (D) returns a failure value (e.g., −1) if a matching entry is not found, and (E) returns a success value (e.g., 0) and fetched flag value and disk position value of the entry if the entry is found in the hash table. In the preferred embodiment, the hash table position function 174 determines the position of a hash table entry based on a predefined number of low order bits of the fingerprint, and then follows a chain of blocks of entries for all fingerprints with the same low order bits. Entries 160 in the hash table 130 for a given value of the low order bits are allocated in blocks of B1 entries per block, where B1 is a tuneable parameter. The above described scheme used in the preferred embodiment has the advantage of storing data in a highly dense manner in the hash table 130. As will be understood by those skilled in the art, many other hash table position functions could be used.

When the Web scooter procedure 140 asks the hash table manager 132 to store a new hash table entry for a specified URL and a specified disk file location, the hash table manager (A) generates a fingerprint of the specified URL using the aforementioned fingerprint hash function 172, (B) passes that value to a hash table position function 174 that determines where in the hash table 130 an entry having that fingerprint value should be stored, and (C) stores a new entry 160 in the hash table at the determined position, with a fetch flag value that indicates the corresponding Web page has not yet been fetched, and also containing the fingerprint value and the specified disk file position.

Web Information Disk File and Buffers

Figure 3:
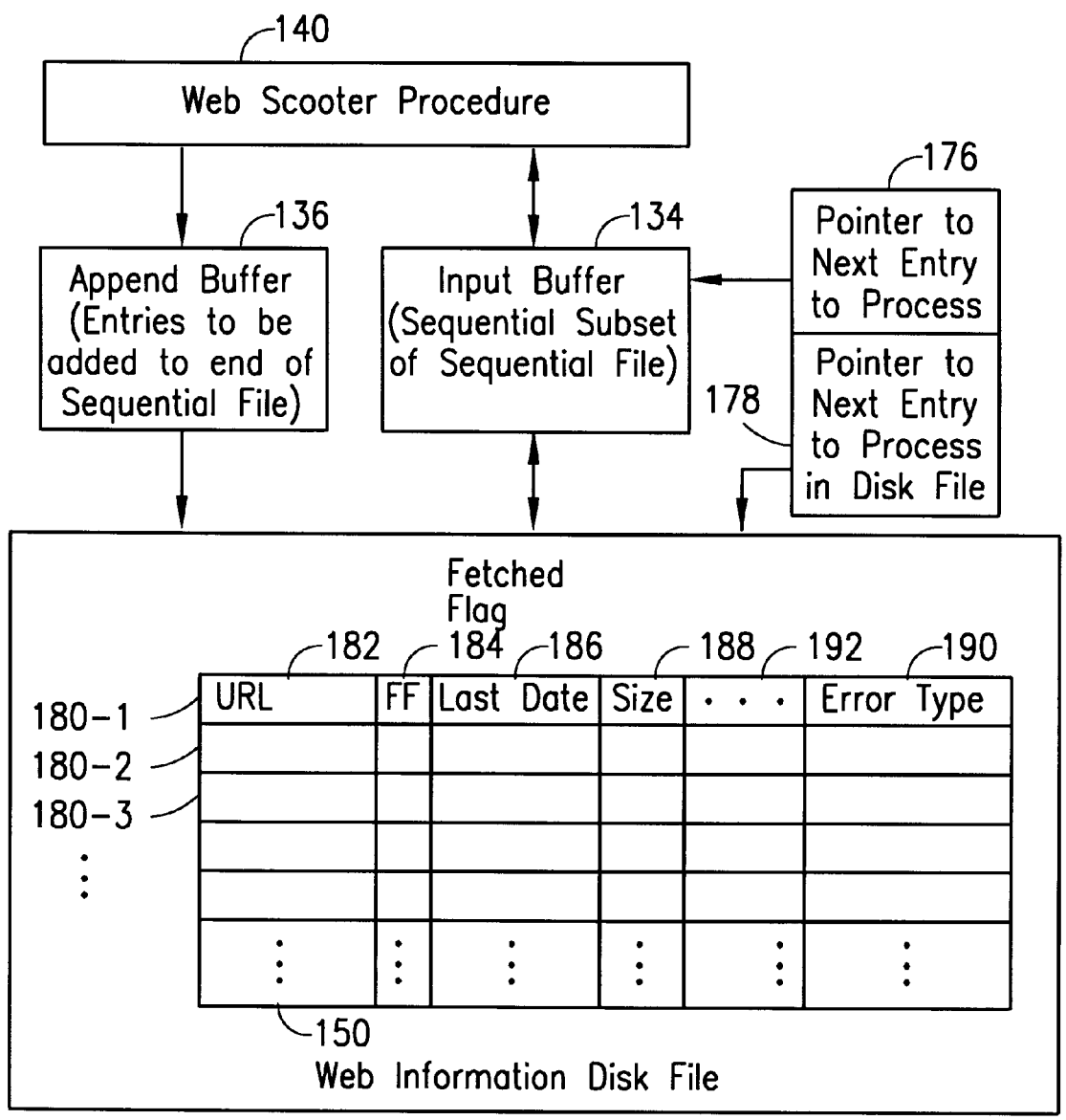
FIG. 3 is a block diagram of the sequential Web information disk file and associated data structures used in a preferred embodiment of the present invention.

Referring to FIG. 3 and Table 2, disk access operations are minimized through the use of an input buffer 134 and an append buffer 136, both of which are located in RAM. Management of the input and append buffers is performed by a background sequential disk file and buffer handler procedure, also known as the disk file manager.

In the preferred embodiment, the input buffer and append buffer are each 50 to 100 Megabytes in size. The input buffer 134 is used to store a sequentially ordered contiguous portion of the Web information disk file 150. The Web scooter procedure maintains a pointer 176 to the next entry in the input buffer to be processed, a pointer 178 to the next entry 180 in the Web information disk file 150 to be transferred to the input buffer 134, as well as a number of other bookkeeping pointers required for coordinating the use of the input buffer 134, append buffer 136 and disk file 150.

All accesses to the Web information disk file 150 are made sequentially via the input buffer 134 such that a large number of entries from the sequential disk file are moved into the input buffer as single I/O operation. The sequential disk file 150 is then accessed from the input buffer. Similarly, all new entries to be added to the sequential file are stored in the append buffer 136, and the contents of the append buffer are added to the end of the sequential file whenever the append buffer is filled. In this way random access to the Web information disk file is eliminated, and latency caused by disk access limitations is minimized.

Each time all the entries in the input buffer 134 have been scanned by the Web scooter, all updates to the entries in the input buffer are stored back into the Web information disk file 150 and all entries in the append buffer 136 are appended to the end of the disk file 150. In addition, the append buffer 136 is cleared and the next set of entries in the disk file, starting immediately after the last set of entries to be copied into the input buffer 134 (as indicated by pointer 178), are copied into the input buffer 134. When the last of the entries in the disk file have been scanned by the Web scooter procedure, scanning resumes at the beginning of the disk file 150.

Whenever the append buffer 136 is filled with new entries, its contents are appended to the end of the disk file 150 and then the append buffer is cleared to receive new entries.

Each entry 180 in the Web information disk file 150 stores:

a variable length URL field 182 that stores the URL for the Web page referenced by the entry;

a fetched flag 184 that indicates whether of not the corresponding Web page has been fetched and analyzed by the Web scooter;

a timestamp 186 indicating the date and time the referenced Web page was fetched, analyzed and indexed;

a size value 188 indicating the size of the Web page;

an error type value 190 that indicates the type of error encountered, if any, the last time an attempt was made to fetch the referenced Web page or if the entry represents a duplicate (i.e., alias URL) entry that should be ignored; and other fetch status parameters 192 not relevant here.

Because the URL field 182 is variable in length, the records 180 in the Web information disk file 150 are also variable in length.

Web Scooter Procedure

Referring now to FIGS. 1–4 and the pseudocode in Table 1, the Web scooter procedure 140 in the preferred embodiment works as follows. When the Web scooter procedure begins execution, it initializes (200) the system's data structures by:

scanning through a pre-existing Web information disk file 150 and initializing the hash table 130 with entries for all entries in the sequential disk file;

copying a first batch of sequential disk entries from the disk file 150 into the input buffer 134;

defining an empty append buffer 136 for new sequential file entries; and defining a mutex 138 for controlling access to the input buffer 134, append buffer 136 and hash table 130.

The Web scooter intializer then launches T1 threads (e.g., 1000 threads are launched in the preferred embodiment), each of which executes the same scooter procedure.

The set of entries in the pre-existing Web information disk file 150, prior to execution of the Web scooter initializer procedure, is called the "root set" 144 of known Web pages. The set of "accessible" Web pages consists of all Web pages referenced by URL links in the root set and all Web pages referenced by URL links in other accessible Web pages. Thus it is possible that some Web pages are not accessible to the Web scooter 102 because there are no URL link connections between the root set and those "inaccessible" Web pages. When information about such Web pages becomes available via various channels, the Web information disk file 150 can be expanded (thereby expanding the root set 144) by "manual" insertion of additional entries or other mechanisms to include additional entries so as to make accessible the previously inaccessible Web pages.

The following is a description of the Web scooter procedure executed by all the simultaneously running threads. The first step of the procedure is to request and wait for the mutex (202). Ownership of the mutex is required so that no two threads will process the same disk file entry, and so that no two threads attempt to write information at the same time to the hash table, input buffer, append buffer or disk file. The hash table 130, input buffer 134, append buffer 136 and disk file 150 are herein collectively called the "protected data structures," because they are collectively protected by use of the mutex. Once a thread owns the mutex, it scans the disk file entries in the input buffer, beginning at the next entry that has not yet been scanned (as indicated by pointer 176), until is locates and selects an entry that meets defined selection criteria (204).

For example, the default selection criteria is: any entry that references a Web page denoted by the entry as never having been fetched, or which was last fetched and analyzed more than H1 hours ago,. where H1 is a operator selectable value, but excluding entries whose error type field indicates the entry is a duplicate entry (i.e., a "non-selected alias," as explained below). If H1 is set to 168, all entries referencing Web pages last fetched analyzed more than a week ago meet the selection criteria. Another example of a selection criteria, in which Web page size is taken into account, is: an entry representing a Web page that has never been fetched, or a Web page of size greater than S1 that was last fetched and analyzed more than H1 hours ago, or a Web page or size S1 or less that was last fetched and analyzer more than H2 hours ago, but excluding entries whose error type field indicates the entry is a "non-selected alias," where S1, H1 and H2 are operator selectable values.

When selecting the next entry to process, the hash table is checked for all known aliases of the current entry candidate to determine if the Web page has already been fetched under an alias. In particular, if an entry meets the defined selection criteria, all known aliases of the URL for the entry are generated using the information in the host name table 126, and then the hash table 130 is checked to see if it stores an entry for any of the alias URLs with a fetched flag that indicates the referenced Web page has been fetched under that alias URL. If the Web page referenced by the current entry candidate in the input buffer is determined to have already been fetched under an alias URL, the error type field 190 of that input buffer entry is modified to indicate that this entry is a "non-selected alias," which prevents the entry from being selected for further processing both at this time and in the future.

Once a Web page reference entry has been selected, the mutex is released so that other threads can access the protected data structures (206). Then the Web scooter procedure attempts to fetch the corresponding Web page (208). After the fetch completes or fails the procedure once again requests and waits for the mutex (210) so that it can once again utilize the protected data structures.

If the fetch is unsuccessful (212-N), the fetch status information in the sequential file entry for that Web page is marked as a fetch failure in accordance with the error return code returned to the Web crawler (214). If the fetch is successful (212-Y), the fetch flag 164 in the hash table entry 160 for the Web page is set, as is the fetch flag 184 in the sequential disk file entry 180 (in the input buffer) for the Web page. In addition, each URL link in the fetched Web page is analyzed (216).

After the fetched Web page has been analyzed, or the fetch failure has been noted in the input buffer entry, the mutex is released so that other threads can access the protected data structures (218).

Figure 4A:
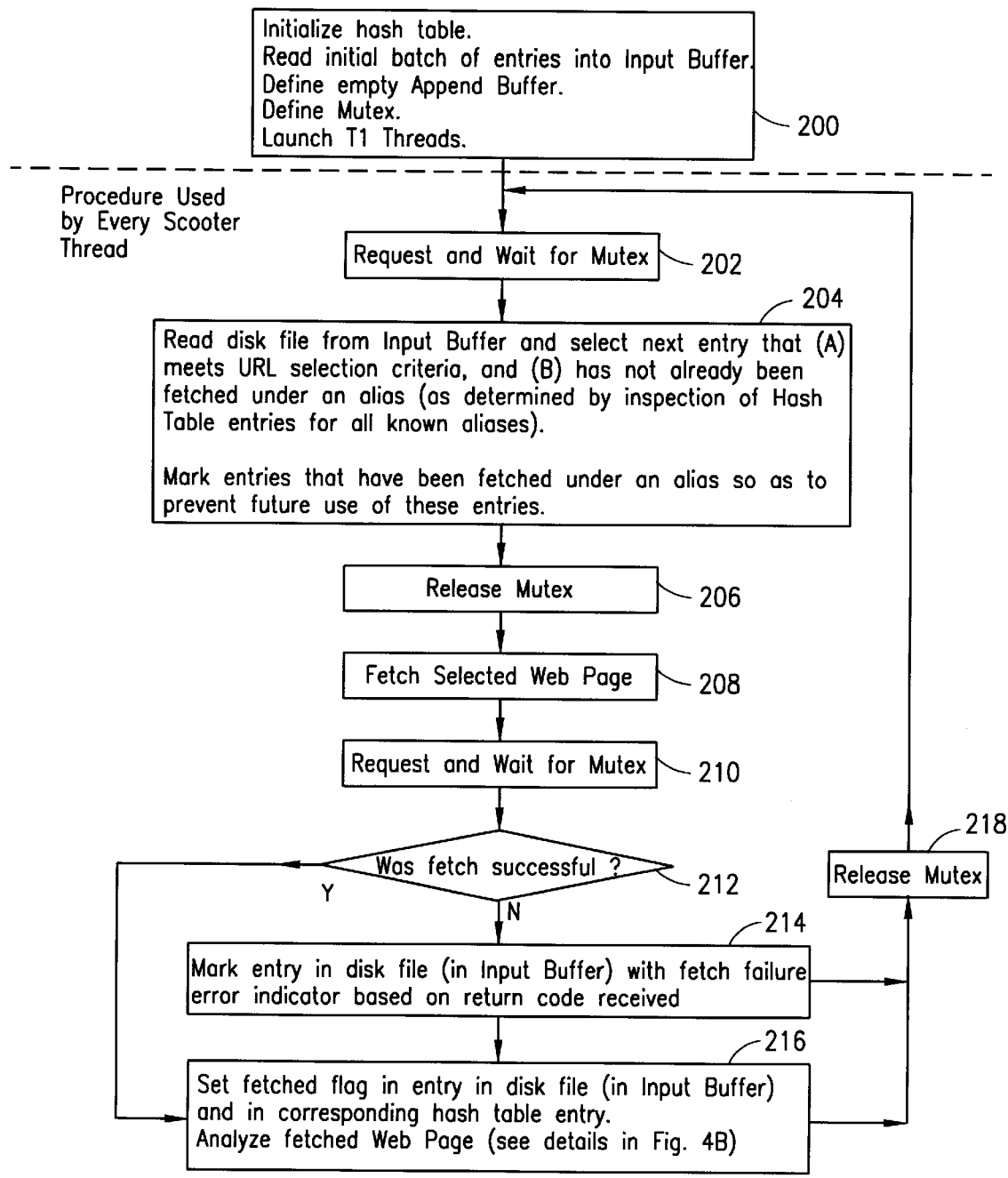
FIGS. 4A and 4B are, flow charts of the Web crawler procedure used in a preferred embodiment of the present invention.
Figure 4B:
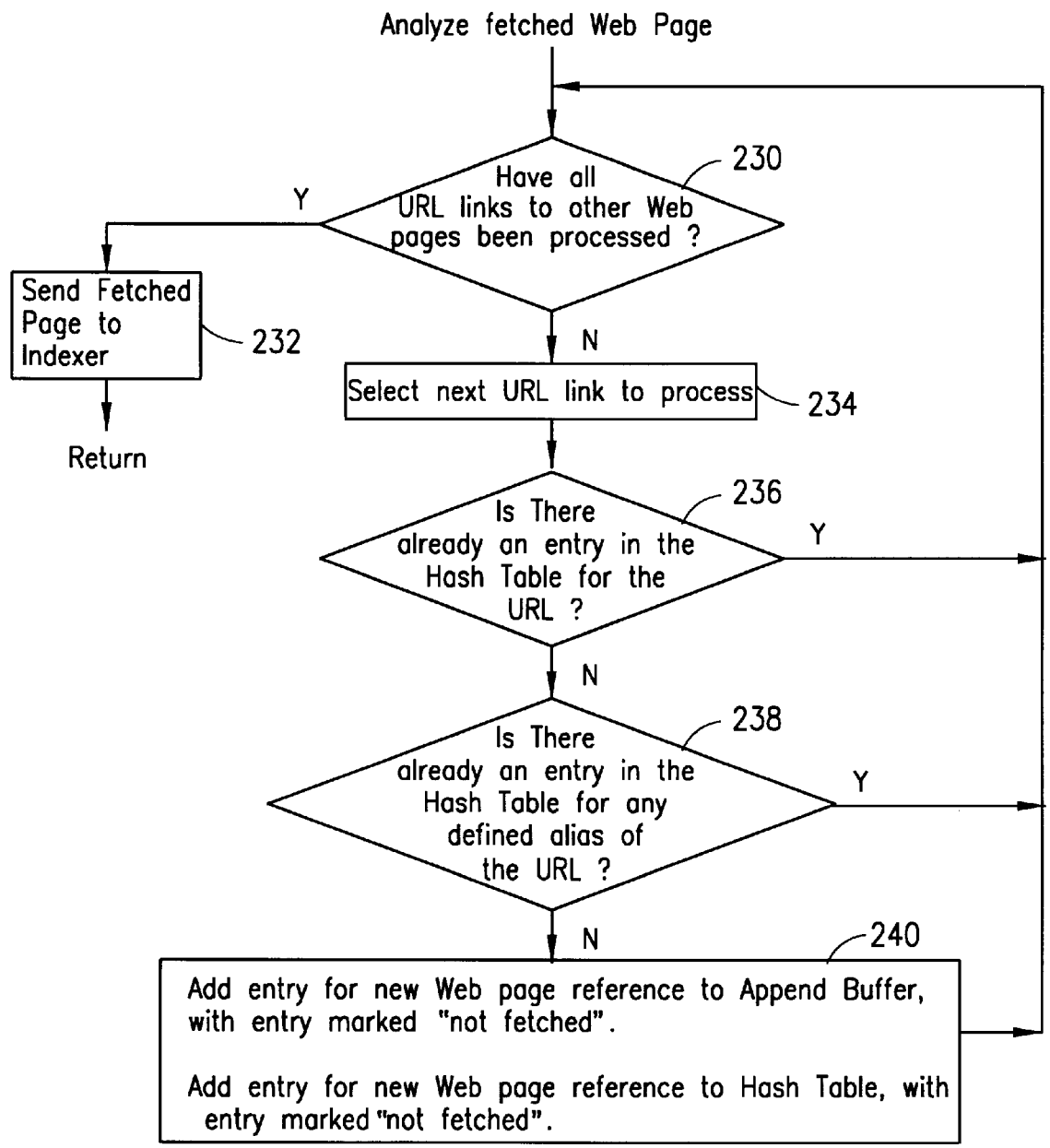

The procedure for analyzing the URL links in the fetched Web page is described next with reference to FIG. 4B. It is noted here that a Web page can include URL links to documents, such as image files, that do not contain information suitable for indexing by the indexing system 108. These referenced documents are often used as components of the Web page that references them. For the purposes of this document, the URL links to component files such as image files and other non-indexable files are not "URL links to other Web pages." These URL links to non-indexable files are ignored by the Web scooter procedure.

Once all the URL links to other Web pages have been processed (230), the fetched Web page is sent to the indexer for indexing (232) and the processing of the fetched Web page by the Web scooter is completed. Otherwise, a next URL link to a Web page is selected (234). If there is already a hash table entry for the URL associated with the selected link (236), no further processing of that link is required and a next URL link is selected (234) if there remain any unprocessed URL links in the Web page being analyzed.

If there isn't already a hash table entry for the URL associated with the selected link (236), all known aliases of the URL for the entry are generated using the information in the host name table 126, and then the hash table 130 is checked to see if it stores an entry for any of the alias URLs (238). If there is an entry in the hash table for any of the alias URLS, no further processing of that link is required and a next URL link is selected (234) if there remain any unprocessed URL links in the Web page being analyzed.

If no entry is found in the hash table for the selected link's URL or any of its aliases, the URL represents a "new" Web page not previously included in the Web crawler's database of Web pages and therefore an entry for the new Web page is added to the portion of the disk file in the append buffer (240). The new disk file entry includes the URL referenced by the link being processed, and is marked "not fetched". In addition, a corresponding new entry is added to the hash table, and the fetch flag of that entry is cleared to indicate that the corresponding Web page has not yet been fetched (240). Then processing of the Web page continues with the next unprocessed URL link in the Web page (234), if there remain any unprocessed URL links in the Web page.

The Web information hash table 130 is used, by procedures whose purpose and operation are outside the scope of this document, as an index into the Web information disk file 150 because the hash table 130 includes disk file location values for each known Web page. In other words, an entry in the Web information disk file is accessed by first reading the disk file address in the corresponding entry in the Web information hash table and then reading the Web information disk file entry at that address.

In summary, the present invention uses three primary mechanisms to overcome the speed limitations of prior art Web crawlers. First, a Web page directory table is stored in RAM with sufficient information to determine which Web pages links represent new Web pages not previously known to the Web crawler, enabling received Web pages to be analyzed without having to accessed a disk file. Second, a more complete Web page directory is accessed only in sequential order, and performing those accesses via large input and append buffers that reduce the number of disk accesses performed to the point that disk accesses do not have a significant impact on the speed performance of the Web crawler.

Third, by using a large number of simultaneously active threads to execute the Web scooter procedure, and by providing a communications interface capable of handling a similar number of simultaneous communication channels to Web servers, the present invention avoids the delays caused by network access latency. In particular, while numerous ones of the threads are waiting for responses to Web page fetch requests, other ones of the threads are analyzing received Web pages. By using a large number of threads all performing the same Web scooter procedure, there will tend to be, on average, a queue of threads with received Web pages that are waiting for the mutex so that they can process the received Web pages. Also, the Web page fetches will tend to be staggered over time. As a result, the Web scooter is rarely in a state where it is waiting to receive a Web page and has no other work to do. Throughput of the Web scooter can then be further increase by using a multiprocessor workstation and further increasing the number of threads that are simultaneously executing the Web scooter procedure.

Alternate Embodiments

Any data structure that has the same properties of the Web information hash table 130, such as a balanced tree, a skip list, or the like, could be used in place of the hash table structure 130 of the preferred embodiment.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

TABLE 1

Pseudocode Representation of Web Scooter Procedure

Procedure: WebScooter
{
/* Initialization Steps */
Scan through pre-existing Web information disk file and initialize Hash
    Table with entries for all entries in the sequential file
Read first batch of sequential disk entries into input buffer in RAM
Define empty Append Buffer for new sequential file entries
Define Mutex for controling access to Input Buffer, Append Buffer and
    Hash Table
Launch 1000 Threads, each executing same Scooter Procedure
}
Procedure: Scooter
{
Do Forever:
    {
    Request and Wait for Mutex
    Read sequential file (in Input Buffer) until a new URL to process is
        selected in accordance with established URL selection criteria.
        When selecting next URL to process, check Hash Table for all
        known aliases of URL to determine if the Web page has already
        been fetched under an alias, and if the Web page has been
        fetched under an alias mark the Error Type field of the
        sequential file entry as a "non-selected alias."
        /*   Example of Selection Criteria: URL has never been fetched,
            or was last fetched more than H1 hours ago, and is not a
            non-selected alias */

TABLE 1-continued

Pseudocode Representation of Web Scooter Procedure

```
    Release Mutex
    Fetch selected Web page
    Request and Wait for Mutex
    If fetch is successful
    {
      Mark page as fetched in Hash Table and Sequential File entry in
          Input Buffer
      /* Analyze Fetched Page */
        For each URL link in the page
        {
          If URL orany defined alias is already in the Hash Table
            { Do Nothing }
          Else
          {
            /*  the URL represents a "New"Web Page not previously
                included in the database   */
            Add new entry for corresponding Web page to the Append
                Buffer, with entry marked "not fetched"
            Add entry to Hash Table, with entry marked "not fetched"
          }
        }
        Send Fetched Page to Indexer for processing
    }
    Else
    {
      Mark the entry in Input Buffer currently being processed with
          appropriate "fetch failure" error indicator based on return code
          received
    }
    Release Mutex
  } /* End of Do Forever Loop   */
}
```

TABLE 2

Pseudocode Representation for Background Sequential File Buffer Handler

```
Procedure: Background Sequential File Buffer Handler (a/k/a the disk file
    manager)
{
Whenever a "read sequential file" instruction overflows the input Buffer
    {
    Copy the Input Buffer back to the sequential disk file
    Read next set of entries into Input Buffer
    Append contents of Append Buffer to the end of the sequential
        disk file
    Clear Append Buffer to prepare for new entries
    }
Whenever an "add entry to sequential file" causes the Append Buffer to
    Overflow
    {
    Append contents of Append Buffer to the end of the sequential
        disk file
    Clear Append Buffer to prepare for new entries
    Add pending new entry to the beginning of the Append Buffer
    }
}
```

What is claimed is:

1. A method for maintaining a table of web pages including a plurality of entries, comprising the steps of:

requesting a first web page having an associated address and an indication of a second web page;

receiving the first web page;

determining whether one of the plurality of entries in the table of web pages corresponds to the indication of the second web page; and entering a locator into the table of web pages responsive to the determination that one of the plurality of entries in the table of web pages does not correspond to the indication of the second web page, the locator representing the address of the second web page, and the locator having a size smaller than the address of the second web page.

2. The method of claim 1, wherein each of the plurality of entries in the table of web pages includes a fetch flag, the method further comprising the step of:

causing the fetch flag corresponding to the entered locator to indicate that the second web page is unfetched.

3. The method of claim 1, wherein the locator is a fingerprint of the address.

4. The method of claim 1, wherein the address is a Universal Resource Locator (URL) and the locator is a fingerprint of the URL.

5. The method of claim 1, further comprising the step of:

storing the table of web pages in a random access memory (RAM).

6. A system for maintaining a table of web pages, the system comprising:

a memory configured to store a table of web pages including a plurality of entries;

a receiver connected to the memory, the receiver configured to receive a first web page having an address and an indication of a second web page; and a processor connected to the memory, the processor configured to store a locator in the memory, the locator representing an address of the second web page and having a size smaller than a size of the address;

wherein none of the plurality of entries in the table of web pages corresponds to the indication of the second web page.

7. The system of claim 6, wherein the processor is further configured to generate the locator based upon the address of the second web page.

8. The system of claim 6, wherein the locator is a fingerprint of the address.

9. The system of claim 6, wherein the address is a Universal Resource Locator (URL).

10. The system of claim 9, wherein the table of web pages includes a hash table.

11. The system of claim 6, wherein the memory includes a random access memory (RAM).

12. The system of claim 6, further comprising:

a plurality of other memories configured to store a plurality of web pages; and a network interconnecting the processor to the plurality of other memories;

wherein the processor is further configured to transmit a request for the first web page to the plurality of other memories via the network and to receive the first web page from one of the plurality of other memories via the network prior to storing the locator in the memory.

13. An article of manufacture for maintaining a table of pages having a plurality of entries, the article of manufacture comprising:

a computer-readable storage medium; and computer programming stored on the storage medium;

wherein the stored computer programming is configured to be readable from the computer-readable storage medium by a computer and thereby cause the computer to operate so as to:

request a first page having an associated address and an indication of a second page;

determine whether one of the plurality of entries in the table of pages corresponds to the indication of the second page; and enter into the table of pages a locator responsive to the determination that one of the plurality of entries in the table of pages does not correspond to the indication of the second page, the locator representing the address of the second page and the locator having a size smaller than the address.

14. The article of manufacture in claim 13, wherein the stored computer programming is further configured to be readable to thereby cause the computer to operate so as to:

generate the locator using a hash table function.

15. The article of manufacture in claim 13, wherein the locator includes a hash function generated portion.

16. The article of manufacture in claim 13, wherein each of the plurality of entries in the table of web pages includes a fetch flag and wherein the stored computer programming is further configured to be readable to thereby cause the computer to operate so as to:

cause the fetch flag corresponding to the entered locator to indicate that the second web page is unfetched.

17. The system of 6, further comprising a buffer memory connected to the processor;

the processor configured to store the locator in the buffer memory;

wherein the locator can be transferred from the buffer memory to the memory.

\* \* \* \* \*